United States Patent
Taylor et al.

(10) Patent No.: US 8,055,795 B2
(45) Date of Patent: Nov. 8, 2011

(54) SYSTEMS AND METHODS FOR PROXY RESOLUTION OF DOMAIN NAME SERVICE (DNS) REQUESTS

(75) Inventors: Thomas Steven Taylor, Atlanta, GA (US); John Yakemovich, Atlanta, GA (US); Alisson Friedrich, Atlanta, GA (US); Tom Hansen, Bethesda, MD (US); Kiruthika Selvamani, Bethesda, MD (US)

(73) Assignee: EchoStar Technologies LLC, Englewood, CO (US)

( * ) Notice: Subject to any disclaimer, the term of this patent is extended or adjusted under 35 U.S.C. 154(b) by 582 days.

(21) Appl. No.: 11/866,130

(22) Filed: Oct. 2, 2007

(65) Prior Publication Data

US 2009/0089441 A1     Apr. 2, 2009

(51) Int. Cl.
*G06F 15/16* (2006.01)
(52) U.S. Cl. ........................ 709/245; 709/227
(58) Field of Classification Search .................. 709/245
See application file for complete search history.

(56) References Cited

U.S. PATENT DOCUMENTS

| | | | |
|---|---|---|---|
| 6,185,619 B1 * | 2/2001 | Joffe et al. | 709/229 |
| 6,795,848 B1 | 9/2004 | Border et al. | |
| 7,020,719 B1 * | 3/2006 | Grove et al. | 709/238 |
| 7,085,817 B1 * | 8/2006 | Tock et al. | 709/217 |
| 7,359,395 B2 * | 4/2008 | Toporek et al. | 370/401 |
| 7,389,330 B2 * | 6/2008 | Dillon et al. | 709/219 |
| 7,389,533 B2 * | 6/2008 | Bartlett et al. | 726/15 |
| 7,526,538 B2 * | 4/2009 | Wilson | 709/220 |
| 2003/0112772 A1 * | 6/2003 | Chatterjee et al. | 370/316 |
| 2004/0194111 A1 * | 9/2004 | Marcey et al. | 719/310 |
| 2004/0205149 A1 * | 10/2004 | Dillon et al. | 709/217 |
| 2005/0044270 A1 * | 2/2005 | Grove et al. | 709/238 |
| 2005/0235044 A1 * | 10/2005 | Tazuma | 709/217 |
| 2006/0031394 A1 * | 2/2006 | Tazuma | 709/217 |
| 2007/0061465 A1 * | 3/2007 | Kim et al. | 709/226 |

FOREIGN PATENT DOCUMENTS

WO    2000052594 A2    9/2000

OTHER PUBLICATIONS

China State Intellectual Property Office "First Office Action of China State Intellectual Property Office," issued Mar. 22, 2011; Appln. No. 200810161268.8.

* cited by examiner

*Primary Examiner* — Jeffrey Pwu
*Assistant Examiner* — Shaq Taha
(74) *Attorney, Agent, or Firm* — Ingrassia Fisher & Lorenz, P.C.

(57) ABSTRACT

Systems and methods are provided for resolving domain name services (DNS) queries for address information about hosts on a network. The queries are posited from remote users across a satellite or other remote link to a network. In response to a domain name services request from the client containing a name of the server, a placeholder address is generated and provided in response to the client. After a subsequent request for a connection to the server is received, the name of the server is re-associated with the placeholder address and the connection request containing the proper host name is forwarded across the data link. A hub processor receives the request for connection, resolves the name of the server to an address on the network, and establishes a connection between the client and the server using the address on the network.

23 Claims, 2 Drawing Sheets

SYSTEMS AND METHODS FOR PROXY RESOLUTION OF DOMAIN NAME SERVICE (DNS) REQUESTS

TECHNICAL FIELD

Figure 1:
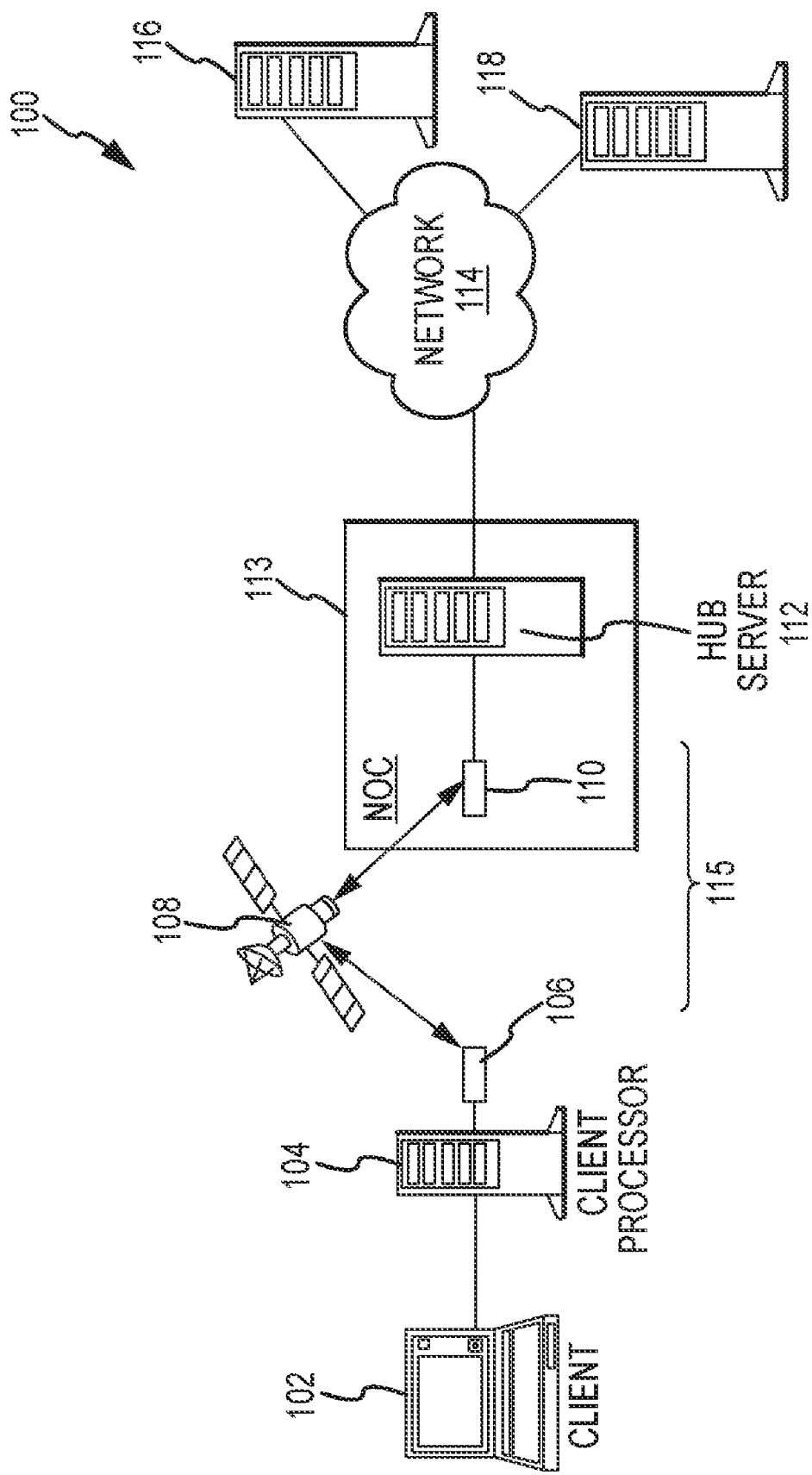

The present invention generally relates to communications over a digital network, and more particularly relates to systems and methods for resolving domain name services (DNS) queries.

BACKGROUND

Usage of digital communications networks such as the Internet continues to expand at a very rapid rate. One feature of the Internet that has led to its widespread adoption is its convenience in identifying destination hosts on the network. Computers generally address each other using numeric addresses that can be expressed in binary, hexadecimal, decimal or other numeric form. The well-known Internet Protocol (IP), for example, identifies computers communicating on a network by a unique four-byte address. These IP addresses are commonly expressed in human terms as four decimal numbers separated by periods, e.g. "192.0.23.256". These addresses, while useful to computers, are generally very difficult for most humans to remember.

As a result, the domain name services (DNS) system has been developed and widely deployed to map numerical addresses used by computers to names that are more easily remembered by people. If a user wishes to contact a particular host on the Internet (e.g. "www.echostar.com"), for example, the user's computer contacts a DNS server on the network to request the numeric address for that host (e.g. "205.172.147.51"). The user's computer can then use the numeric address to contact the relevant host on the network.

Although the Internet already links billions of users and nodes worldwide, additional communications links are continually designed and deployed into the marketplace. Satellite links, for example, have shown great promise in providing access to communications networks in a convenient wireless manner. Satellites are typically capable of delivering very high data throughput levels across a wide service area without requiring significant infrastructure (e.g. cables or land based routers) to be in place. As a result, there is significant interest in providing data access to the Internet or another network via satellite links.

Satellite communications have a known disadvantage in inherent latency. In the case of geo-synchronously orbiting satellites, for example, the distance for the signal to travel into space and back to earth can be significant, taking half a second or so to complete the round-trip even at the speed of light. As a result of this inherent feature in satellite communications, the user at the remote end of the satellite connection can experience significant delays for certain tasks. A conventional DNS query for an address of a remote host, for example, typically involves transmitting a query to a DNS server across the satellite link (250 ms) and receiving the reply from the DNS server across the link (another 250 ms), thereby creating a delay of a half second or so to complete the query. This delay time can be frustrating to the end user.

It is therefore desirable to create systems and techniques for efficiently resolving domain name services queries across satellite or other links. These and other desirable features and characteristics will become apparent from the subsequent detailed description and the appended claims, taken in conjunction with the accompanying drawings and this background section.

BRIEF SUMMARY

According to various exemplary embodiments, systems and methods are provided for establishing connections from a client to a server on a network across a satellite or other data link. In one embodiment, a placeholder address is generated in response to a domain name services request from the client containing a name of the server. The placeholder address is then provided in response to the client instead of the actual address of the remote server. After a subsequent request for a connection to the server is received, the name of the server is re-associated with the placeholder address and the connection request containing the proper host name is forwarded across the data link. A hub processor receives the request for connection, resolves the name of the server to an address on the network, and establishes a connection between the client and the server using the address on the network.

In other embodiments, a method of establishing a connection from a client to a server on a network is provided. A domain name services request containing a name of the server is received from the client. Rather than resolving the actual address of the server, a response is sent to the client that includes a placeholder address. After receiving a subsequent request for the connection from the client that contains the placeholder address, the placeholder address is replaced with the name of the server and forwarded across the data link to a hub server that is able to resolve the address and establish the connection with the server on the network.

In still other embodiments, a method of establishing a connection between a client and a server on a network over a data link is provided. A request for the connection is received that includes an unresolved name of the server. After obtaining an address of the server from a domain name services server on the network, the connection is subsequently established between the client and the server using the address of the server.

Other embodiments include computer program products and digital storage media having computer-executable instructions stored thereon. Various other embodiments, aspects and other features are described in more detail below.

BRIEF DESCRIPTION OF THE DRAWING FIGURES

Figure 2:
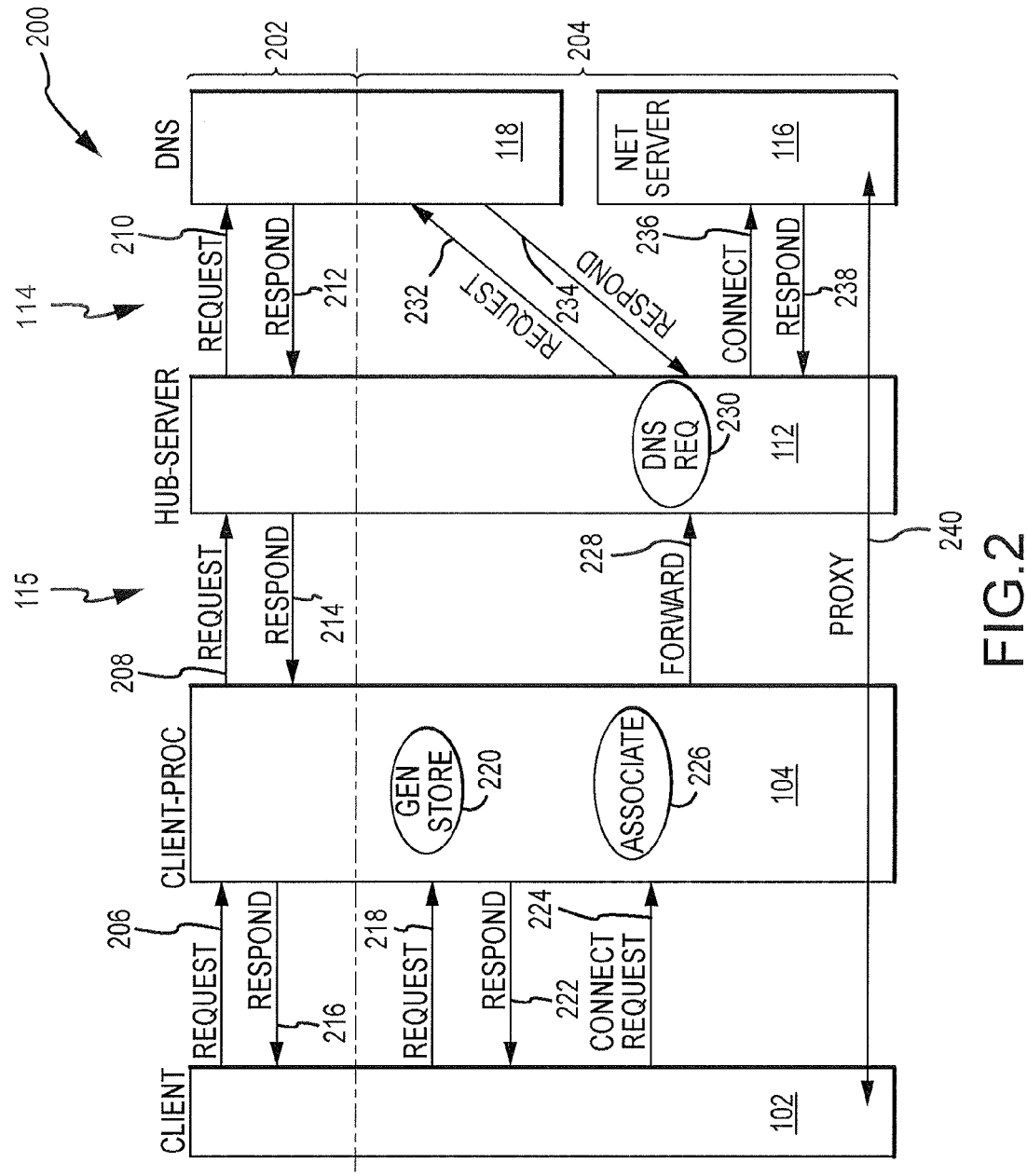

Exemplary embodiments will hereinafter be described in conjunction with the following drawing figures, wherein like numerals denote like elements, and FIG. 1 is a block diagram of an exemplary communications system; and FIG. 2 is a data flow diagram showing exemplary processes for handling DNS queries across a communications link.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments present systems, methods, computer program products and other useful features for improving the performance of domain name services (DNS) queries placed across a network link. Generally speaking, a client processor system receives a domain name services query from a client and, rather than resolving the query across the network, provides a placeholder response to the client while storing the query data for later retrieval. In a subsequent request for services containing the placeholder response, the client processor is able to replace the placeholder with the stored information contained in the original DNS query. The request for services with the original query information can then be forwarded across the satellite or other link, and a hub server at the other end of the link is able to process both the DNS query and the request for services on the network. Because the DNS request information is combined with the service request information, there is no need for a separate DNS query/response to be sent across the network link. By reducing the number of messages sent across the link, the overall experience for the user can be improved significantly.

It should be appreciated at the outset that the techniques described below may be particularly beneficial when used over network links known to exhibit high latency, such as satellite links. In practice however, the concepts, techniques and structures described herein may be readily adapted to any type of data communication placed over any type of link, including any sort of hardwired or wireless link used in conjunction with any type of public, private, governmental, telephone and/or other network system. To that end, the concepts proposed herein may be readily modified as appropriate to suit any number of relevant preferences and parameters. In particular, the exemplary data values and other parameters described herein are strictly examples, and are not intended to limit the scope of the inventions in any way. Various alternate but equivalent embodiments may therefore be created, with any number of parameter values or factors being selected, scaled or otherwise processed in any appropriate manner different from the examples described herein.

Turning now to the drawing figures and with initial reference to FIG. 1, an exemplary network communications system 100 suitably includes a user/client node 102 communicating via a link 115 with a remote host 116 on network 114. DNS information is obtained from a DNS server 118 operating on network 114 to facilitate communications between client 102 and server 116 as appropriate.

Client node 102 is any computer, personal digital assistant, telephone and/or other device capable of communicating with network 114 via link 115. Client node 102 may execute any conventional browser application or other software as appropriate to establish communications using an IP based protocol or the like. Multiple client nodes 102 may share a single network link 115; user nodes and network links need not be provided in one-to-one correspondence as shown in FIG. 1.

In various embodiments, client node 102 interacts with a client-side router, gateway or other processor 104 that guides communications between user node(s) 102 and link 115. In various embodiments, client processor 104 is a separate hardware device from host 102, although in other embodiments client processor may be implemented in software or firmware physically residing within host 102 or in any other location. Client-side processor 104 suitably interacts with a modem or other transceiver capable of linking to satellite 106 and/or otherwise providing communications across link 115.

Generally speaking, a satellite 108 or similar link 115 has sufficient capacity to process communications from multiple client processors 104. Each link 115 generally couples to network 114 at a network operations center (NOC) 113. NOC 113 includes any server 112 or cluster of servers 112 capable of supporting communications with the various client nodes 102 across link 115. NOC 113 typically includes any number of "hub" server nodes 112 that communicate over link 115 via any type of modem or other transceiver 110. NOC 113 may support links to multiple satellites 108 and/or other links 115, as appropriate.

Typically, client processor 104 and hub server 112 interoperate with each other to facilitate efficient communication across network link 115. In one satellite-based embodiment, for example, a request from client node 102 to connect with server 116 involves a request path from node 102 through client processor 104, to satellite 108 via transceiver 106, and to the NOC 113 via transceiver 110. Hub server 112 then provides the appropriate communication to server 116 through network 114. Response data from server 116 traverses network 114, server 112, transceiver no, satellite 108, transceiver 106 and client processor 104 before reaching client node 102. In various further embodiments, hub server 112 acts as a "proxy" for client 102 on network 114 by acting on behalf of client 102, and forwarding data between client 102 and server 116 as appropriate. By acting on behalf of client 102, communications over link 115 can be reduced or minimized, thereby leading to improvements in the overall experience for the user.

With primary reference now to FIG. 2, domain name services queries can be made more efficient by combining DNS query data and requests for connections into common messages that can be resolved without additional data being sent across the slow network link. By reducing the number of messages sent and received across link 115, the delay experienced by the end user can be reduced, thereby improving the overall experience for the user.

Using a conventional DNS query technique 202, client 102 formulates an appropriate DNS query packet 206 that is received at client processor 104. Client processor 104 forwards the request across link 115 as message 208, which is received at hub server 112 as appropriate. Hub server 112 then obtains the requested DNS information by placing a query 210 to an appropriate DNS server 118 on network 114, and receiving an appropriate response 212 containing the requested information. This information can then be forwarded across link 115 (response message 214), and ultimately delivered to the requesting node 102 as response 216.

In most embodiments, it is helpful to shield any non-standard formatting associated with link 115 from host 102 and/or any hosts 116, 118 on network 114. That is, it may be beneficial in many implementations for requests 206 and 210 to be placed in a standard DNS format, and for response messages 212 and 216 to be received in standard formats. Domain name services protocols used on common networks such as the Internet are generally made public and are very well defined, for example in Internet RFCs 1034 and 1035.

Communications between client processor 104 and hub server 112, however, may be readily enhanced in any manner that improves usage of link 115. In an exemplary process 204, requests for domain name services information and for connections or other services can be combined into a single communication across link 115. By eliminating the need to wait for both the DNS query and the request for connection to make round trips across a high-latency link 115, the speed of the connection process can be greatly improved.

DNS request 218 generally corresponds to request 206 in that it is a conventional DNS request sent by client node 102 that includes a hostname or other identifier for a server 116 on network 114. Generally speaking, request 218 is a request for IP or other relevant address information corresponding to the hostname identified in request 218 so that subsequent connections/transactions can be established between client 102 and server 116.

Upon receipt of DNS request 206, client processor 104 stores the hostname or other identifier contained in the request for subsequent retrieval (process 220 in FIG. 2). Such storage may be in an ASCII or other "flat" file, in volatile or non-volatile memory, in a database, and/or in any other storage structure as appropriate. In various embodiments, client processor 104 provides a response 222 to client node 102 that includes "dummy" or "placeholder" data rather than an actual address corresponding to network host 116. This placeholder data can be generated as part of process 220 in FIG. 2, and can be stored in client processor 104 along with the originally-requested hostname for subsequent retrieval and processing.

Client node 102 does not typically know that the received information is a placeholder; in subsequent requests for information or connections from server 116, client node 102 will use the placeholder information as if it were the actual address of server 116 on network 114. Connection request 224, for example, will typically be a conventional request for services and/or a connection from server 116, except that the address of server 116 will be replaced with the placeholder information contained in response 222. In many embodiments, the client request 224 is a conventional request for a TCP connection to the placeholder address. Such a request 224 may include a hypertext transport protocol (HTTP) "GET" request, for example, as well as any other conventional structures as appropriate. Such a request 224 is generally sent to the placeholder address provided by client processor 104; such requests can be identified and intercepted by the client processor 104 before they reach network link 115.

After receiving a request 224 for a connection from client 102, client processor 104 suitably replaces the placeholder information with the hostname or other server identification contained in the original DNS request 218. This association (shown as process 226 in FIG. 2) allows the connection request 228 to be forwarded across link 115 without the need for DNS resolution, thereby improving the usage of the link and reducing overall delay in establishing the connection to server 116. Forwarded communication 228, then, contains both unresolved hostname information and information about the connection requested. This information is then sent across link 115 to hub server 112. In various embodiments, message 228 includes the HTFP "GET" request contained in message 224, with the placeholder address replaced by the hostname that was previously stored at client processor 104. Other embodiments may use other structures or formats as appropriate.

Hub server 112 suitably receives the forwarded request message 228 containing the host identification data, resolves the DNS information, and then processes the request itself as appropriate. DNS resolution (process 230 in FIG. 2) can be processed in accordance with any technique. The address associated with server 116 may be resolved locally in some embodiments, and/or a DNS query 232 can be made to a DNS server 118 on network 114 to obtain results 234 as appropriate. In this instance, request 232 and response 234 generally correspond to request 210 and response 212 described above.

Once address information about server 116 is obtained at hub server 112, a connection with server 116 can be established and/or information can be obtained from server 116 as appropriate. In one embodiment, hub server 112 places a connection request 236 to server 116 and processes any responses 238 as appropriate. Responses 238 may be sent back to client node 102 for further processing, for example. In various embodiments, the hub server 112 forwards data received from the web server 116 to client processor 104 using a TCP or other connection. Client server 104, in turn, forwards the data to the client computer 102 using the TCP connection to the placeholder address that was opened earlier. In other embodiments, any other sort of virtual connection 240 is formed between server 116 and client 102 to thereby allow hub server 112 to act on behalf of client 102 for transactions on network 114. During subsequent operation, then, information can be exchanged between server 116 and client 102 on network 114 in any manner.

In an exemplary embodiment, then, delays perceived by a user are reduced by eliminating the need for a separate DNS query 208 and response 214 to be sent across the link 115. To eliminate such messages, a client processor 104 receives DNS queries from the client node(s) 102, responds to the queries with placeholder addresses, and retains the hostname or other identifier information contained in the queries 218 for later use. In response to a subsequent service request 224 (e.g. an HTTP 'GET' command) directed toward to the placeholder address previously provided, the client processor 104 retrieves the identifier information contained in the original query and forwards the identifier information along with the service request to a hub server 112. Hub server 112 is then able to resolve the DNS query using the original hostname/identifier, and to request services using the resolved address of the network host. Such services can be provided from hub server 112 back to client processor 104, which then responds to the service request 224 as appropriate. In many embodiments, the client node 102 "thinks" that it is dealing with a server located at the placeholder address, when in actuality the placeholder address simply refers to a port, process, daemon or other logical structure in client processor 104, which then forwards service requests across link 115 to hub server 112. Through the interaction of client processor 104 and hub server 112, data services can be obtained without undue latency delays caused by extraneous transmissions across link 115.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the functions and arrangements of the various elements described without departing from the scope of the invention.

What is claimed is:

1. A method of establishing a connection from a client to any of a plurality of servers each having a name and an actual network address on a network, wherein the client and the network are separated by a satellite link, the method comprising the steps of:

receiving a domain name services request from the client at a client processor on a same side of the satellite link as the client, wherein the domain name services request contains the name of a particular one of the plurality of servers operating on the network;

generating a unique placeholder address for the particular server by the client processor, wherein the unique placeholder address is generated independently from the actual network address of the particular server so that the unique placeholder address is different from the actual network address of the particular server, and wherein the unique placeholder address uniquely identifies the particular server from other servers in the plurality of servers;

providing the placeholder address for the particular server from the client processor to the client in response to the domain name services request;

receiving a subsequent request for the connection from the client at the client processor, wherein the request contains the unique placeholder address for the particular server;

in response to the subsequent request, formulating a combined request from the client processor that contains the name of the particular server rather than the unique placeholder address fore the particular server; and forwarding the combined request together with the name of the particular server from the client processor across the satellite link to a hub server to thereby allow the hub server to obtain the actual network address of the particular server using the name of the particular server contained in the combined request, and to then request the connection between the client and the particular server on the network using the actual network address of the particular server obtained by the hub server.

2. The method of claim 1 further comprising the steps of receiving a response from the hub server across the satellite link and forwarding the response to the client.

3. The method of claim 1 wherein the hub server is further configured to receive the subsequent request containing the name of the particular server at the hub server, to query a domain name server using the name of the particular server to obtain address information about the particular server, and to establish the connection with the particular server using the address information.

4. The method of claim 3 further comprising the step of transferring information between the client and the particular server over the satellite link after the connection is established.

5. The method of claim 1 further comprising establishing a TCP connection with the client using the unique placeholder address so that the client interacts with the particular server using the unique placeholder address rather than the actual address of the particular server on the network.

6. The method of claim 1 wherein the subsequent request comprises an HTTP "GET" request containing the unique placeholder address of the server.

7. The method of claim 1 wherein the unique placeholder address is randomly assigned.

8. The method of claim 1 wherein the unique placeholder address is sequentially assigned.

9. The method of claim 1 wherein the client processor provides the unique placeholder address to the client without transmitting a domain name services request across the satellite link.

10. A hardware device configured to execute a method to establish a connection from a client to a particular one of a plurality of servers each having an actual address on a network, wherein the hardware device and the plurality of servers are separated by a satellite link, and wherein the method comprises:

receiving a domain name services request from the client at the hardware device, wherein the domain name services request contains a name of the particular one of the plurality of servers;

generating a unique placeholder address for the particular server at the hardware device, wherein the unique placeholder address identifies the particular server to the hardware device using an address that is generated independently from the actual network address of the particular server so that the unique placeholder address is different from the actual address of the particular server and wherein the unique placeholder address uniquely identifies the particular server from other servers in the plurality of servers;

providing the unique placeholder address for the particular server from the hardware device to the client in response to the domain name services request;

receiving a subsequent request for the connection from the client to the particular server at the hardware device, wherein the request contains the unique placeholder address that identifies the particular server to the hardware device;

in response to the subsequent request containing the unique placeholder address of the particular server, formulating a combined request at the hardware device that replaces the unique placeholder address in the subsequent request with the name of the particular server; and forwarding the combined request containing the name of the particular server from the hardware device to a hub server across the data link to thereby allow the hub server to determine the actual address of the particular server from the name of the particular server and to establish the connection between the client and the particular server on the network using the actual address of the particular server.

11. A method of establishing a connection over a satellite link between a client and a particular one of a plurality of servers each having a name and an actual address on a network, the method comprising the steps of:

receiving a request for the connection from a client processor located with the client on an opposite side of the satellite link, wherein the client processor and the client are configured to identify the particular server using a unique placeholder address that is generated independently from the actual network address of the particular server so that the unique placeholder address is different from the actual address of the particular server, wherein the unique placeholder address uniquely identifies the particular server from other servers in the plurality of servers, wherein the client is configured to transmit the request to the client processor using the unique placeholder address, and wherein the client processor is configured to replace the unique placeholder address in the request with the name of the particular server before transmitting the request across the satellite link;

obtaining the actual address of the particular server from a domain name services server on the network using the name of the particular server contained in the request received from the client processor;

subsequently contacting the particular server on the network using the actual address to obtain a response to the request; and responding to the request over the satellite link.

12. The method of claim 11 further comprising the step of transferring information between the client and the particular server over the link after the connection is established.

13. The method of claim 11 wherein the establishing step comprises minimizing communications across the satellite link.

14. The method of claim 11 wherein the receiving, obtaining and establishing steps are performed on an opposite side of the satellite link from the client, and on the same side of the data link as the plurality of servers on the network.

15. The method of claim 14 wherein the client is configured to communicate with the particular server over the satellite link using the unique placeholder address instead of the actual address of the particular server on the network.

16. The method of claim 11 wherein the request for connection is received from a client processor across the satellite link that facilitates communications by the client on the data link.

17. The method of claim 16 wherein the client processor is configured to receive a domain name services request from the client containing the name of the particular server, to generate the placeholder address that is different from the actual address of the server and that identifies the particular server to the client processor, to provide a response to the domain name services request that contains the unique placeholder address, to re-associate the name of the particular server with the unique placeholder address after receiving a subsequent request for a connection to the server from the client containing the unique placeholder address, and to forward the subsequent request containing the name of the particular server across the satellite link as the request for the connection.

18. A system configured for establishing a connection over a satellite link between a client and a particular one of a plurality of servers each having a name and an actual address on a network, the system comprising:
  a hardware device configured to receive a domain name services request from the client containing the name of the particular one of the plurality of servers, to generate a unique placeholder address that identifies the particular server from the other ones of the plurality of servers to the hardware device using an address that is different from the actual address of the particular server, to respond to the client with a response to the domain name services request that contains the unique placeholder address rather than the actual address of the particular server, to re-associate the name of the particular server with the unique placeholder address after receiving a subsequent request for a connection to the server from the client containing the unique placeholder address, and to forward the subsequent request containing the name of the particular server across the satellite link; and
  a hub processor configured to receive the subsequent request containing the name of the particular server via the satellite link, to resolve the name of the particular server to the actual address of the particular server on the network, and to establish a connection between the client and the particular server using the actual address on the network.

19. The system of claim 18 wherein the hardware device is further configured to establish a TCP connection with the client using the unique placeholder address so that the client interacts with the particular server via the TCP connection using the unique placeholder address rather than the actual address.

20. The system of claim 18 wherein the hardware device responds to the client with the unique placeholder address without transmitting a domain name services request across the satellite link.

21. The method of claim 1 wherein the unique placeholder address is provided to the client rather than the actual address of the particular server.

22. The method of claim 1 wherein the unique placeholder address comprises dummy data instead of the actual address of the particular server.

23. The method of claim 1 wherein the unique placeholder address is provided to the client as a substitute for the actual address of the particular server.

* * * * *

UNITED STATES PATENT AND TRADEMARK OFFICE
CERTIFICATE OF CORRECTION

PATENT NO. : 8,055,795 B2  Page 1 of 1
APPLICATION NO. : 11/866130
DATED : November 8, 2011
INVENTOR(S) : Thomas Steven Taylor et al.

It is certified that error appears in the above-identified patent and that said Letters Patent is hereby corrected as shown below:

In Claim 1, column 7, line 11, replace the word "fore" with the word "for"

Signed and Sealed this
Thirteenth Day of November, 2012

David J. Kappos
*Director of the United States Patent and Trademark Office*